United States Patent
Hallak (10) Patent No.: US 8,115,517 B2
(45) Date of Patent: Feb. 14, 2012

(54) CIRCUIT ARRANGEMENT FOR IDENTIFYING NETWORK ZERO CROSSINGS

(75) Inventor: Jalal Hallak, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 73 days.

(21) Appl. No.: 12/593,338

(22) PCT Filed: Jan. 22, 2008

(86) PCT No.: PCT/EP2008/050687
§ 371 (c)(1),
(2), (4) Date: Sep. 28, 2009

(87) PCT Pub. No.: WO2008/116674
PCT Pub. Date: Oct. 2, 2008

(65) Prior Publication Data
US 2010/0109709 A1  May 6, 2010

(30) Foreign Application Priority Data
Mar. 28, 2007  (AT) .................. A 483/2007

(51) Int. Cl.
*H03K 5/153* (2006.01)
(52) U.S. Cl. .......................... 327/79; 327/419
(58) Field of Classification Search .................. None
See application file for complete search history.

(56) References Cited

U.S. PATENT DOCUMENTS

| | | | |
|---|---|---|---|
| 4,687,163 A * | 8/1987 | Ringer | 246/428 |
| 5,166,549 A | 11/1992 | DeDoncker | |
| 5,198,771 A * | 3/1993 | Fidler et al. | 324/438 |
| 6,756,771 B1 * | 6/2004 | Ball et al. | 323/222 |
| 7,567,445 B2 * | 7/2009 | Coulson et al. | 363/21.12 |

FOREIGN PATENT DOCUMENTS

| | | |
|---|---|---|
| DE | 19710161 A1 | 9/1998 |
| DE | 102005030634 A1 | 1/2007 |
| GB | 2434455 A | 7/2007 |
| JP | 3194474 A | 8/1991 |
| JP | 9056076 A | 2/1997 |
| JP | 10145200 A | 5/1998 |
| SU | 658675 A1 | 4/1979 |

OTHER PUBLICATIONS

Communication from Russian Patent office, received Oct. 21, 2011, pp. 1-6.

* cited by examiner

*Primary Examiner* — Lincoln Donovan
*Assistant Examiner* — Sibin Chen

(57) ABSTRACT

A circuit arrangement for identifying network zero crossings of a network voltage of an alternating current network is provided. A measurement current generated by the network voltage is supplied to a zero crossing detector in order to produce a network zero crossing signal. A current sink is arranged between a live conductor and a neutral conductor of the alternating current network, the current sink allowing the path of a current value of the measurement current generated by the network voltage to be defined.

9 Claims, 6 Drawing Sheets

CIRCUIT ARRANGEMENT FOR IDENTIFYING NETWORK ZERO CROSSINGS

CROSS REFERENCE TO RELATED APPLICATIONS

This application is the US National Stage of International Application No. PCT/EP2008/116674 filed Jan. 22, 2008, and claims the benefit thereof. The International Application claims the benefits of Austrian Application No. A483/2007 AT filed Mar. 28, 2007; both of the applications are incorporated by reference herein in their entirety.

FIELD OF INVENTION

The invention relates to a circuit arrangement for identifying network zero crossings of the mains voltage of an alternating current network, with a measuring current generated by the mains voltage being supplied to a zero-crossing detector in order to produce a network zero crossing signal.

BACKGROUND OF INVENTION

Circuit arrangements for identifying network zero crossings of a mains voltage of an alternating current network are used wherever a signal synchronous to the AC voltage is needed.

One area of application is the in-phase control of power sections of a converter or of an inverter as a function of zero crossings of the mains voltage.

In such cases the converter or inverter is typically used to provide electrical energy in the form of an alternating current which is suitable for feeding into the alternating current network. One area of application for this is the connection of alternate power sources to a mostly public alternating current power network. Such power sources can be solar panels, fuel cells, wind power generators or other power sources such as rechargeable batteries.

According to the prior art there are numerous known converter circuits with different possible applications. Different basic types of electronic converter such as boost converters, buck converters or boost-buck converters are used to generate a half-wave current, combined with full or half bridges for inverting each second half wave resulting in a single-phase or multi-phase current.

In photovoltaic systems in particular different demands of the network operator and the authorities must be fulfilled, for example the supply of a sine-wave current. The sine-wave form is in such cases generally derived from the mains voltage.

An important criterion for a network-synchronous supply is the precise detection of the network zero crossing points for in-phase control of the power sections. The zero crossings in the mains voltage define for the inverter control the times at which the switchover is to be made from a positive to a negative half wave and vice versa.

The in-phase control of the power parts of an inverter is also important for the safety of the device however. An incorrect switchover from a positive to a negative half wave or vice versa leads without appropriate safeguarding measures to a short circuit in the power section of the inverter, which can result in the power components being damaged or destroyed.

A known circuit arrangement for identifying zero crossings consists of a voltage divider and a comparator or operational amplifier (cf. FIGS. 1 and 2) In this arrangement a square-wave signal is present at the output of the comparator or operational amplifier, with for example its low value showing a negative half wave and its high value a positive half wave of the mains voltage. The signal value thus changes with each zero crossing of the mains voltage. The resistors of the voltage divider are at high resistance in this case in order to keep the power dissipation low.

SUMMARY OF INVENTION

Such circuits, because of the high-resistance inputs of the comparator or operational amplifier, are susceptible to incorrect detection of the zero crossings. The triggers for such incorrect detection can be electromagnetic faults or faults in the network. It can occur in such cases that at the input of the comparator or operational amplifier there is a current value present of which the leading sign does not correspond to the required phase position of the mains voltage at that moment, meaning that an incorrect zero crossing is registered.

An object of the invention is to specify a circuit arrangement of the type given above which allows detection of the network zero crossings to be safeguarded against faults.

In accordance with the invention this object is achieved by a circuit arrangement for detecting zero crossings of a mains voltage of an alternating current network, with a measurement current generated by the mains voltage being supplied to a zero crossing detector to form a network zero crossing signal and with a current sink being arranged between live conductor and neutral conductor of the alternating current network, by means of which the curve of the current value of the measurement current generated by the mains voltage is defined.

The use of the current sink ensures that the level of the measurement current value is high enough, even with low mains voltage values in the zero crossing area, to retain the in-phase leading sign of the measurement current even with faults affecting the measurement current. If for example an electromagnetic fault during a positive network half-wave causes the measurement current value to fall at the input of the zero crossing detector, this value still remains positive and the zero crossing is not detected incorrectly.

The inventive arrangement thus provides a sufficiently high measurement current in the critical area close to the network zero crossings in order to detect the network zero crossing unaffected by the influence of any faults. But on the other hand the power dissipation is kept low by a corresponding limitation of the measurement current in the area of the peak points of the mains voltage.

In an advantageous embodiment of the invention the current sink is embodied as a variable current sink, in order to optimize the power dissipation by a variable curve of the measurement current.

In this case it is advantageous for example for the curve of the current value caused by the variable current sink to be indirectly proportional to the curve of the mains voltage. The signal for controlling the current sink and thereby for defining the curve of the measurement current value can be derived directly from the curve of the mains voltage.

To provide a particularly marked rise in the measurement current in the area of the network zero crossings it is useful to set a correspondingly high proportional factor and in doing so to limit the curve of the measurement current value for high mains voltage values with a minimum value.

In an advantageous circuit arrangement the current sink is arranged in series with a resistor and arranged in parallel to the resistor is a zero crossing detector embodied as a comparator or operational amplifier. This arrangement is able to be realized with simple components and delivers at the output of the zero crossing detector a rectangular signal, of which the high value shows a positive half-wave and the low value shows a negative half-wave of the mains voltage.

In such cases it is useful for the output of the comparator or the operational amplifier to be connected to an element for electrical isolation, e.g. an optocoupler.

In another circuit arrangement the current sink is arranged in series with an element for electrical isolation, e.g. an optocoupler. In this arrangement an inverted square-wave signal is present at the output of the optocoupler. The low value thereafter shows a positive half wave and the high value a negative half wave of the mains voltage. This arrangement delivers an electrically-isolated network zero crossing signal with few components.

The current sink is embodied as a unidirectional or bidirectional current sink depending on the desired zero crossing signal. In a circuit with a unidirectional current sink the measurement current remains unequal to zero for as long as the mains voltage is greater than zero or, for the embodiment with optocoupler arranged in series to the current sink, for as long as the mains voltage is greater than the conducting-state voltage of the optocoupler diode.

Furthermore the invention relates to an inverter, of which the power part is controlled as a function of the network zero crossings of a mains voltage of an alternating current network. In this case an inverter is provided for supplying electrical energy in an alternating current network in which the zero crossings of the mains voltage are detected by means of an inventive circuit arrangement.

In particular with inverters for connecting alternate current sources to an alternating current network it is important to achieve a high level of efficiency to safeguard the cost effectiveness of alternate power generation. Therefore especially low-loss components are used in the power sections of such inverters.

Such components are very sensitive to incorrect phase changes and the network short circuits resulting from them. It is therefore important for the network zero crossings to be securely detected.

BRIEF DESCRIPTION OF THE DRAWINGS

The invention will be explained below using examples which refer to the enclosed figures. The figures show the following schematic diagrams.

DETAILED DESCRIPTION OF INVENTION

Figure 1:
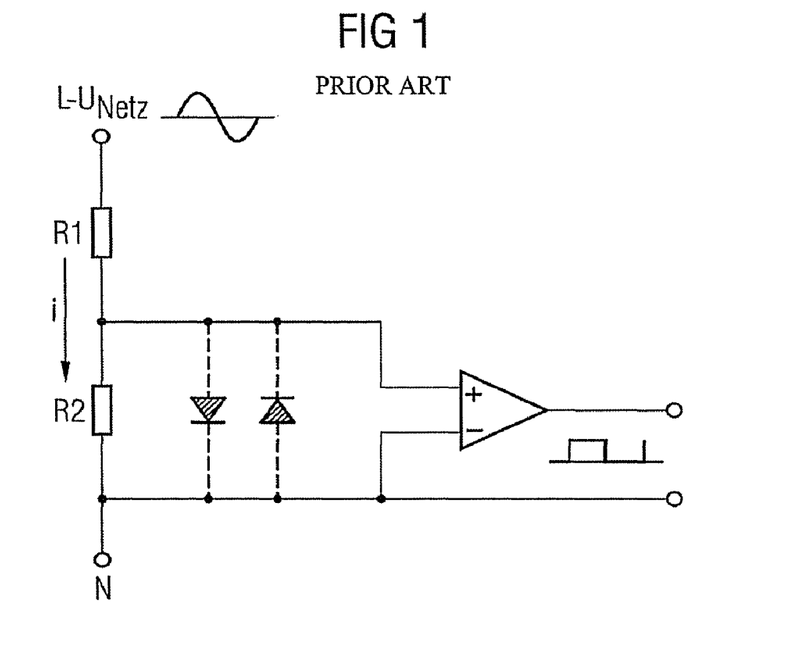
FIG. 1 circuit arrangement with voltage divider and comparator (prior art)

FIG. 1 shows a simple circuit arrangement for detecting network zero crossings in accordance with the prior art. In this diagram two resistors R1 and R2 faun a voltage divider between live conductor L and neutral conductor N of an alternating current network. Starting from the conductor L, the mains voltage $U_{NETZ}$ is lowered via the first resistor R1 and the second resistor R2, with the measurement current i flowing through the resistors R1, R2. Connected in parallel to the second resistor R2 is a comparator or operational amplifier as zero-crossing detector, at the output of which the zero crossing signal is present as a square-wave signal. The high value corresponds to a positive half wave of the mains voltage $U_{NETZ}$ and the low value to a negative half wave of the mains voltage $U_{NETZ}$. The inputs of the comparator or operational amplifier can be protected with protective diodes.

To keep the power dissipation produced low, the two resistors R1, R2 are as a rule embodied with high resistance (e.g. 200 kΩ to 300 kΩ for the first resistor R1 and 2 kΩ to 5 kΩ for the second resistor R2). With a 230V alternating current network this produces a maximum total power loss of 0.26 W (without taking account of the protective diodes).

For the measurement current i, at the peak value of the mains voltage $U_{NETZ}$, this produces a value of 1.61 mA (without taking account of the protective diodes) and in the zero crossing area at a mains voltage $U_{NETZ}$ of 1V a value of 5 µA (without taking account of the protective diodes).

FIG. 2 once again shows a circuit according to the prior art with a voltage divider and a comparator or operational amplifier, with the output of the comparator or the operational amplifier being provided with an optocoupler OPTO for electrical isolation. Since the optocoupler effects an inversion of the signal, the inputs of the comparator or operational amplifier are swapped over, so that the same signal is present as zero crossing signal at the output of the optocoupler OPTO as is present at the output of the comparator or operational amplifier in FIG. 1.

Figure 2:
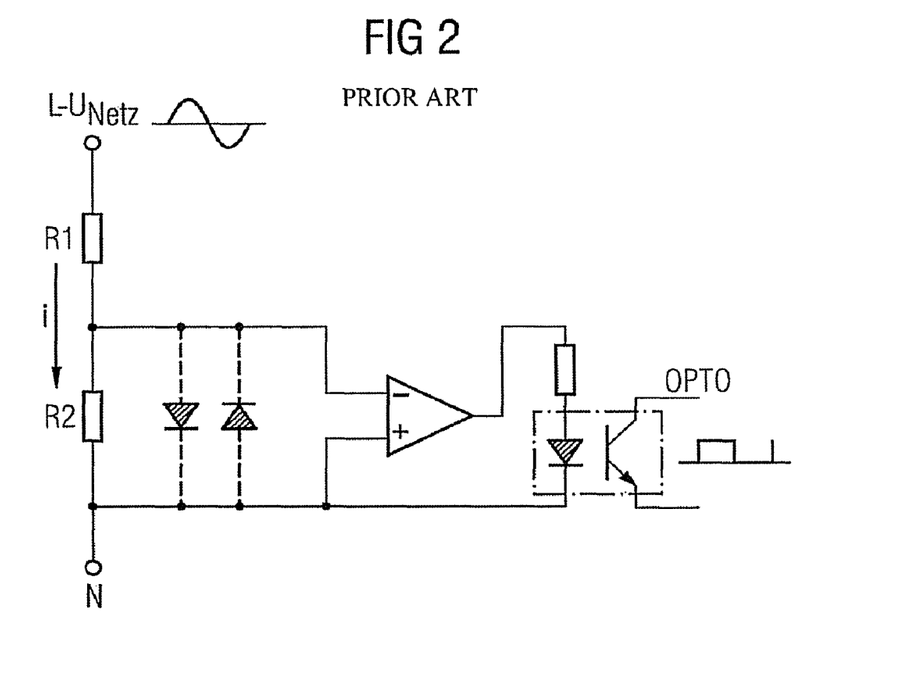
FIG. 2 circuit arrangement as depicted in FIG. 1, expanded by an optocoupler (prior art)

The prior art circuits shown in FIGS. 1 and 2 are very sensitive to faults when the mains voltage $U_{NETZ}$ is approaching a zero crossing and thereby the measuring current i in the voltage divider becomes very small. Then for example small electromagnetic faults are sufficient, which are emitted onto the high-resistance input connections of the comparator or operational amplifier to cause an incorrect evaluation of the comparator or operational amplifier. Likewise slight faults in the network itself can lead to an error during the zero crossing detection, since as a result of the small measurement current i, faults of low power can already lead to a change of leading sign at the input of the comparator or operational amplifier.

Figure 3:
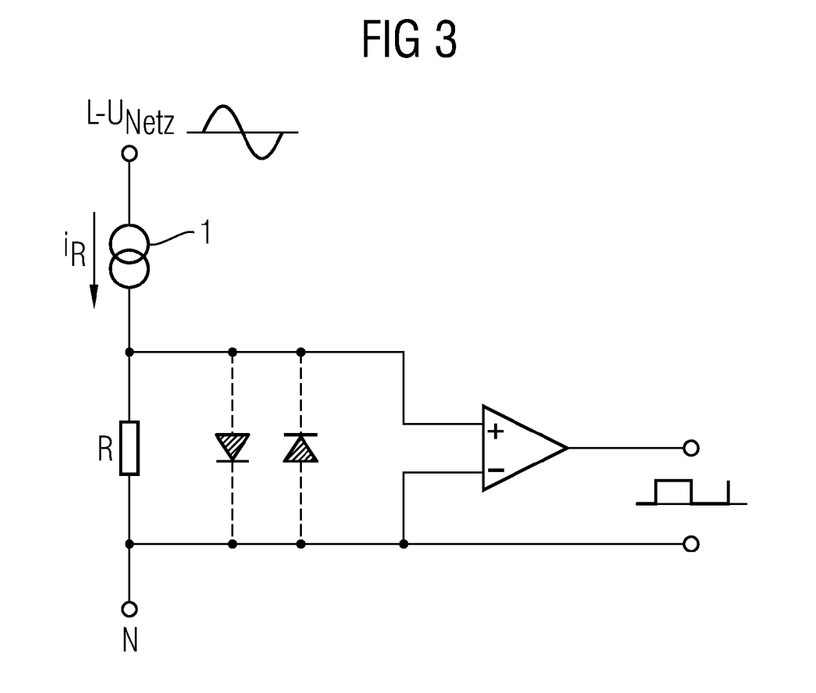
FIG. 3 exemplary embodiment of an inventive circuit arrangement with comparator

An inventive circuit arrangement, shown in FIG. 3, does not exhibit these disadvantages. This circuit arrangement differs from that shown in FIG. 1 in that, instead of the first resistor R1, a current sink 1, an electrical load with controlled current or voltage, is provided.

The current sink is set in the simplest case so that at a mains voltage $U_{NETZ}$ not equal to zero, a constant measurement current $i_R$ flows. The current sink 1 can in this case be embodied as a unidirectional or as a bidirectional current sink. In the first case a constant measurement current $i_R$ only flows with a positive (or only with a negative) half-wave of the mains voltage $U_{NETZ}$. The beginning or the end of a zero value phase of the measurement current $1_R$ specifies with a unidirectional current sink 1 the time of a zero crossing of the mains voltage $U_{NETZ}$. With a bidirectional current sink 1 the direction of flow of the measurement current $i_R$ reverses with the zero crossing of the mains voltage $U_{NETZ}$. Thus the change of leading sign of the measurement current $i_R$ shows the point in time of a zero crossing of the mains voltage $U_{NETZ}$.

Figure 4:
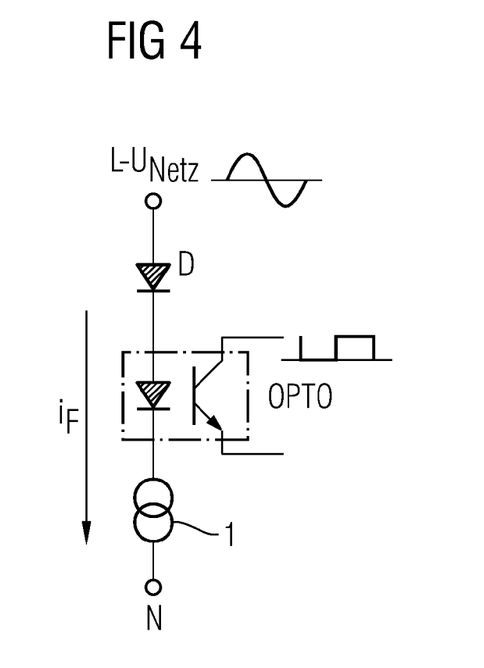
FIG. 4 exemplary embodiment of an inventive circuit arrangement with optocoupler FIG. 5 exemplary embodiment of an inventive circuit arrangement with two current sinks and two optocouplers FIG. 6 control of a voltage or current-controlled unidirectional current sink FIG. 7 signal curves when using a unidirectional current sink FIG. 8 control of a voltage or current-controlled bidirectional current sink FIG. 9 signal curves when using a bidirectional current sink

Another inventive circuit arrangement is shown in FIG. 4. In this case a current sink is switched in series with a diode and an optocoupler as zero crossing detector between the conductor L and the neutral wire N of an alternating current network. In the simplest case this series connection causes a constant measurement current $i_F$ to flow again if the mains voltage $U_{NETZ}$ is larger than the sum of the conducting current of the diode D and the conducting current of the diode of the optocoupler OPTO. The start or the end of a zero value phase of the measurement current $i_F$ in this case indicates a zero crossing of the mains voltage $U_{NETZ}$. The imprecisions resulting from the conducting voltages of the diodes can be compensated for by a downstream analog or digital compensation unit since the known conducting currents of the diodes are as a rule only subject to minimal changes (e.g. with temperature fluctuations).

Figure 5:
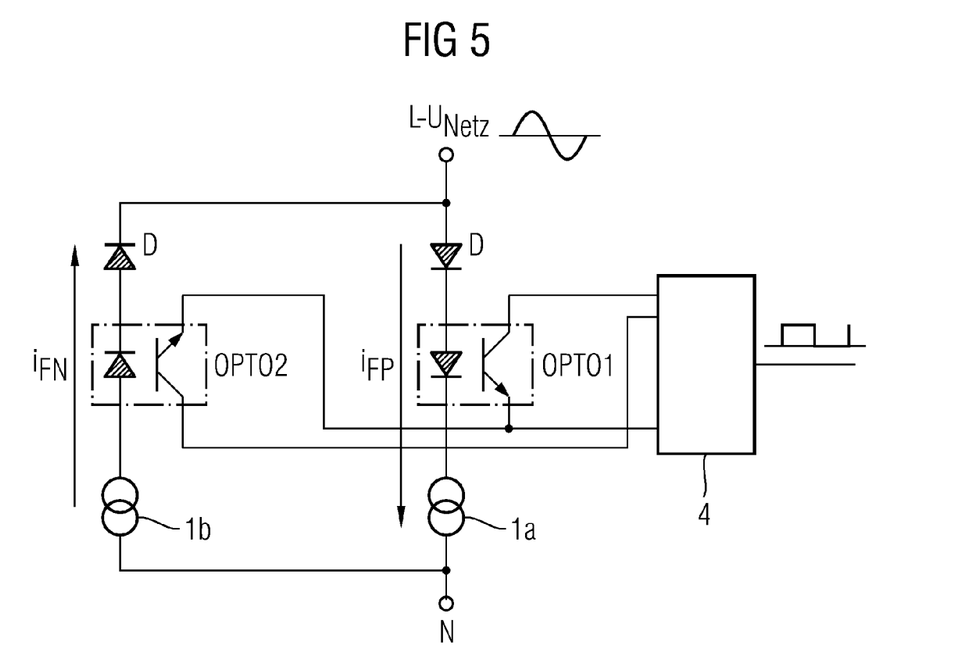

At the output of the optocoupler OPTO isolated electrically from the input there is then an inverted zero crossing signal in the form of a square wave. The high value shows a negative half-wave and the low value a positive half wave of the mains voltage $U_{NETZ}$. To increase the security of zero crossing detection, to detect the negative half wave and to detect the positive half waves of the mains voltage $U_{NETZ}$ one series circuit comprising a current converter $1a$, $1b$ and an optocoupler OPTO1, OPTO2 are used. Such a circuit arrangement is shown in FIG. 5. During a positive half wave of the mains voltage $U_{NETZ}$ a positive measurement current $i_{FP}$ flows through a first optocoupler OPTO1 and a first current sink $1a$. During a negative half wave of the mains voltage $U_{NETZ}$ a negative measurement current $i_{FP}$ flows through a second current sink $1b$ and a second optocoupler OPTO2. The output signals of the two optocouplers OPTO1, OPTO2 are supplied to a logic circuit 4 in which the two signals are processed to form an averaged zero crossing signal for example.

Thus the advantage of an inventive circuit lies in the high level of amplification of the measurement current $i_R$ or $i_F$ in the area of the network zero crossings of the mains voltage $U_{NETZ}$. The high measurement current $i_R$ or $i_F$ respectively right through to the immediate proximity to a network zero crossing in the current sink and the sudden removal of the measurement current $i_R$ or $i_F$ with a polarity change of the network current $U_{NETZ}$ means that a much clearer zero crossing signal can be obtained than is possible with a prior art voltage divider.

Above all it is important for an inverter, even with heavily disturbed networks with harmonics in the mains voltage $U_{NETZ}$, to securely detect the actual polarity (i.e. the polarity of the basic oscillation) of the mains voltage $U_{NETZ}$. Depending on the power part of an inverter even an error detection of a zero crossing with an actual mains voltage $U_{NETZ}$ of a few volts can lead to a short circuit current damaging a component as a result of incorrectly switched power transistors.

The network zero crossing detection in this case is increasingly more secure from network faults as the measurement current $i_R$ or $i_F$ increases. In such cases however it should be noted that as the current increases through the current sink the power dissipation in the current sink also becomes greater.

Thus, in an advantageous embodiment there is therefore provision for specifying the measurement current $i_R$ or $i_F$ variably so that it is high in the area of the zero crossings and low in the area of the peak values of the mains voltage $U_{NETZ}$. A corresponding example of a unidirectional current sink is specified in FIGS. 6 and 7.

Figure 6:
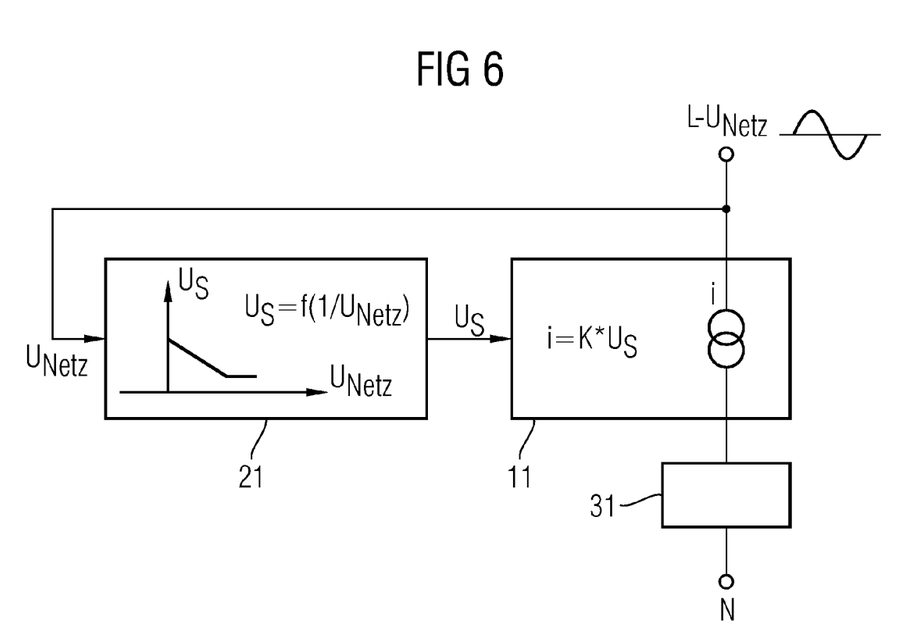

FIG. 6 shows a simplified diagram of the signal processing in the individual elements of an inventive circuit arrangement. The voltage or current-controlled current sink 11 is connected in series with a zero crossing detector 31 between the live conductor L and the neutral conductor N of an alternating current network. In addition the mains voltage $U_{NETZ}$ is fed to a control unit 21 of the current sink. In the control unit 21 the current sink is supplied with a prespecified current sink voltage $U_S$ as a function $U_S=f(1/U_{NETZ})$ of the mains voltage $U_{NETZ}$. This function determines for example for the mains voltage $U_{NETZ}$ equal to zero a highest value for the current sink voltage. Further on the current sink voltage $U_S$ falls in a linear manner as the mains voltage $U_{NETZ}$ rises, with a lower limit being provided.

In the current sink 11 the measuring current i is specified by the current sink 11 as a product of the current sink voltage $U_S$ with a constant factor K. Thus the measurement current is also the result of a function of the reciprocal value of the mains voltage $U_{NETZ}$ ($i=f(1/U_{NETZ})$).

Figure 7:
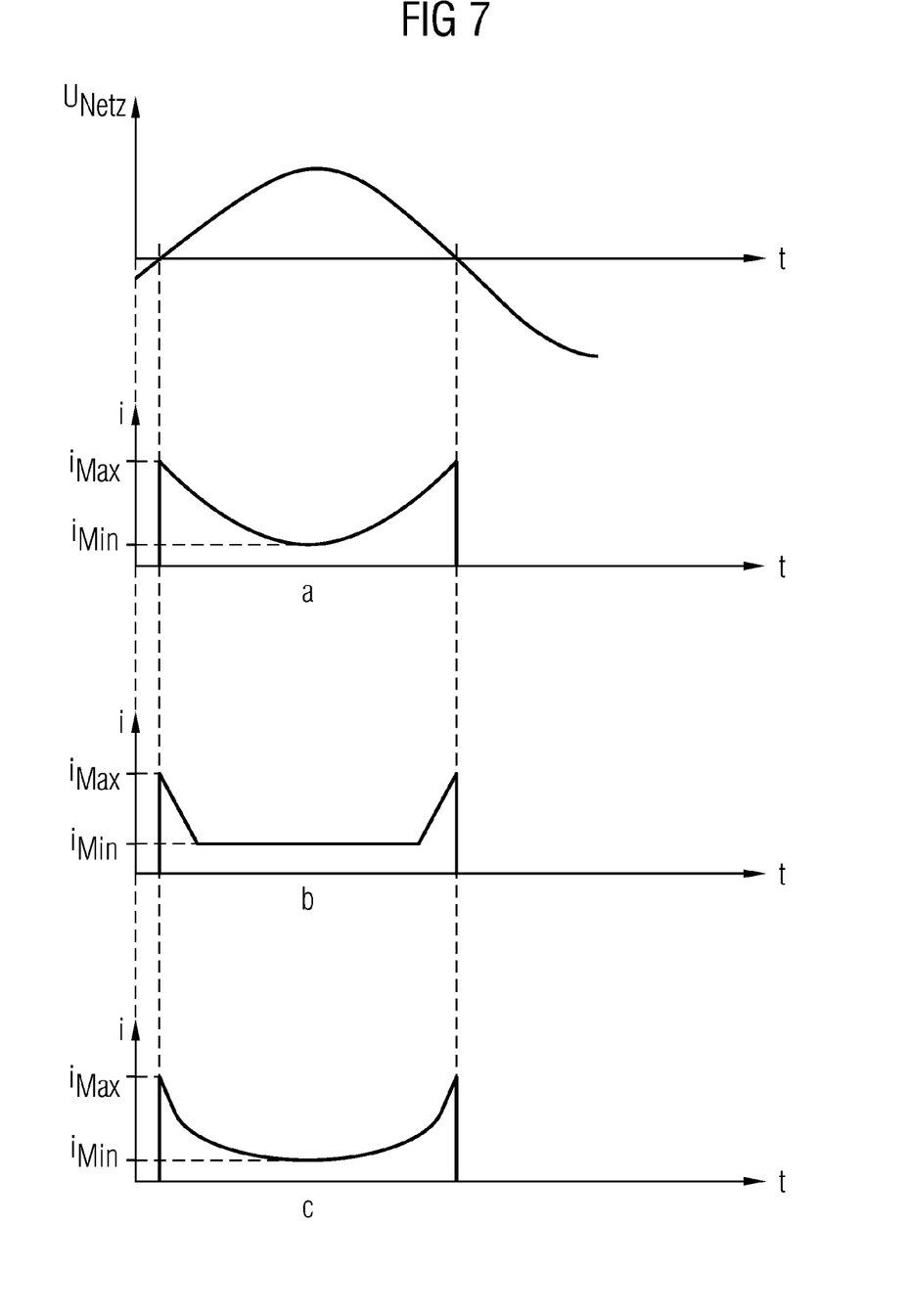

The signal curves with different functions for the measurement current $i=f(1/U_{NETZ})$ are shown in FIG. 7. In the diagrams the time t is plotted on the abscissa. The first diagram shows the curve of the mains voltage $U_{NETZ}$ over the time t, with a unidirectional current source with a conducting direction for positive half waves of the mains voltage $U_{NETZ}$ being assumed.

As long as the mains voltage $U_{NETZ}$ is negative, the value of the measurement current i remains equal to zero. In the second diagram a curve a for the measurement current over the time t is shown, with this curve a being based on a linear function of the measurement current i over the mains voltage $U_{NETZ}$. With the zero crossing of the mains voltage $U_{NETZ}$ the measurement current i jumps to a prespecified maximum value Maxi and then run indirectly proportional to the curve of the mains voltage $U_{NETZ}$. At the time of reaching the mains voltage peak the measurement current i reaches a minimum value $i_{Min}$.

The third diagram shows a curve b with a linear function of the measurement current i over the mains voltage $U_{NETZ}$ and a lower limit value $i_{Min}$ of the measurement current i. Such a curve b, by contrast with the previous curve a, allows a steeper drop in the measurement current i as the mains voltage $U_{NETZ}$ increases and thereby a lowering of the power dissipation. The power dissipation amounts to 0.39 W, for a 230V alternating current network for example if 6 mA is specified as a maximum value $i_{Max}$ of the measurement voltage and 3 mA as a minimum value $i_{Min}$ of the measurement voltage and the minimum value $i_{Min}$ is reached at a rated voltage value of 100V. This means that the power dissipation is in the range of the example given above for a prior art circuit, whereas the measurement current i close to the zero crossings reaches 1200 times the value (6 mA/5 µA) of the prior art measurement current.

In a further diagram a curve c of the measurement current i over time t is shown with a non-linear function of the measurement current i from the network current $U_{NETZ}$.

Figure 8:
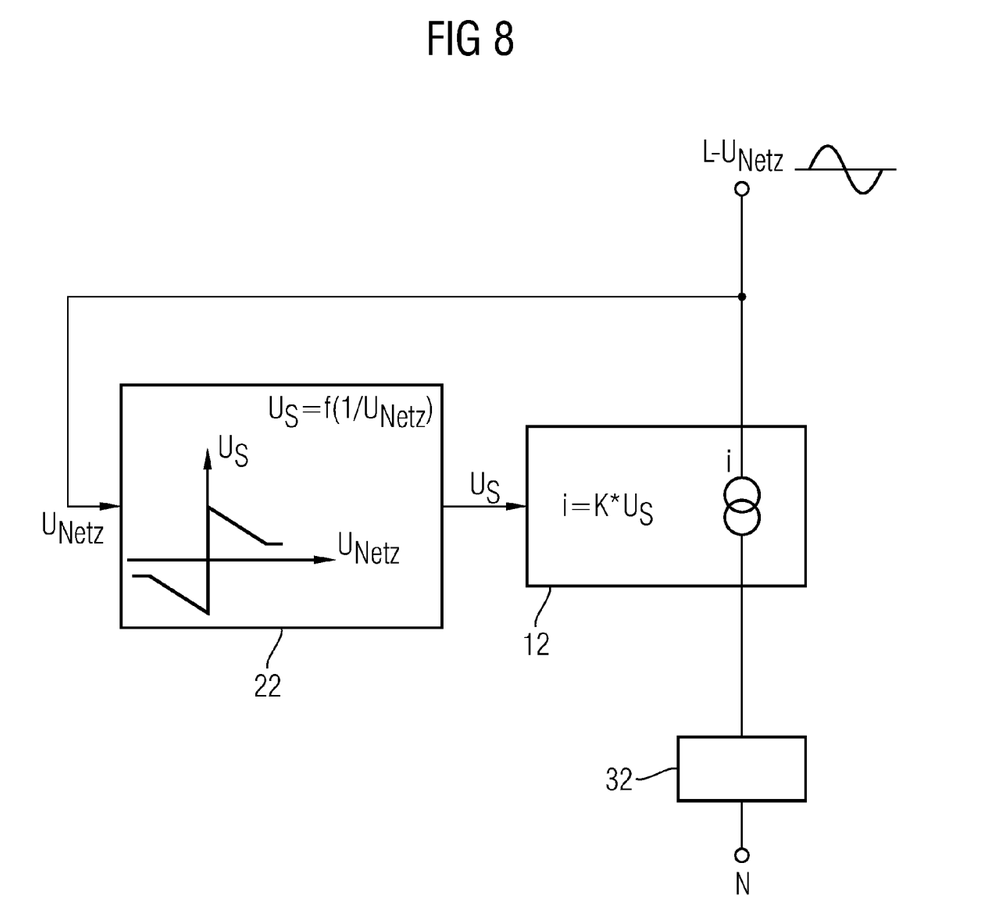
Figure 9:
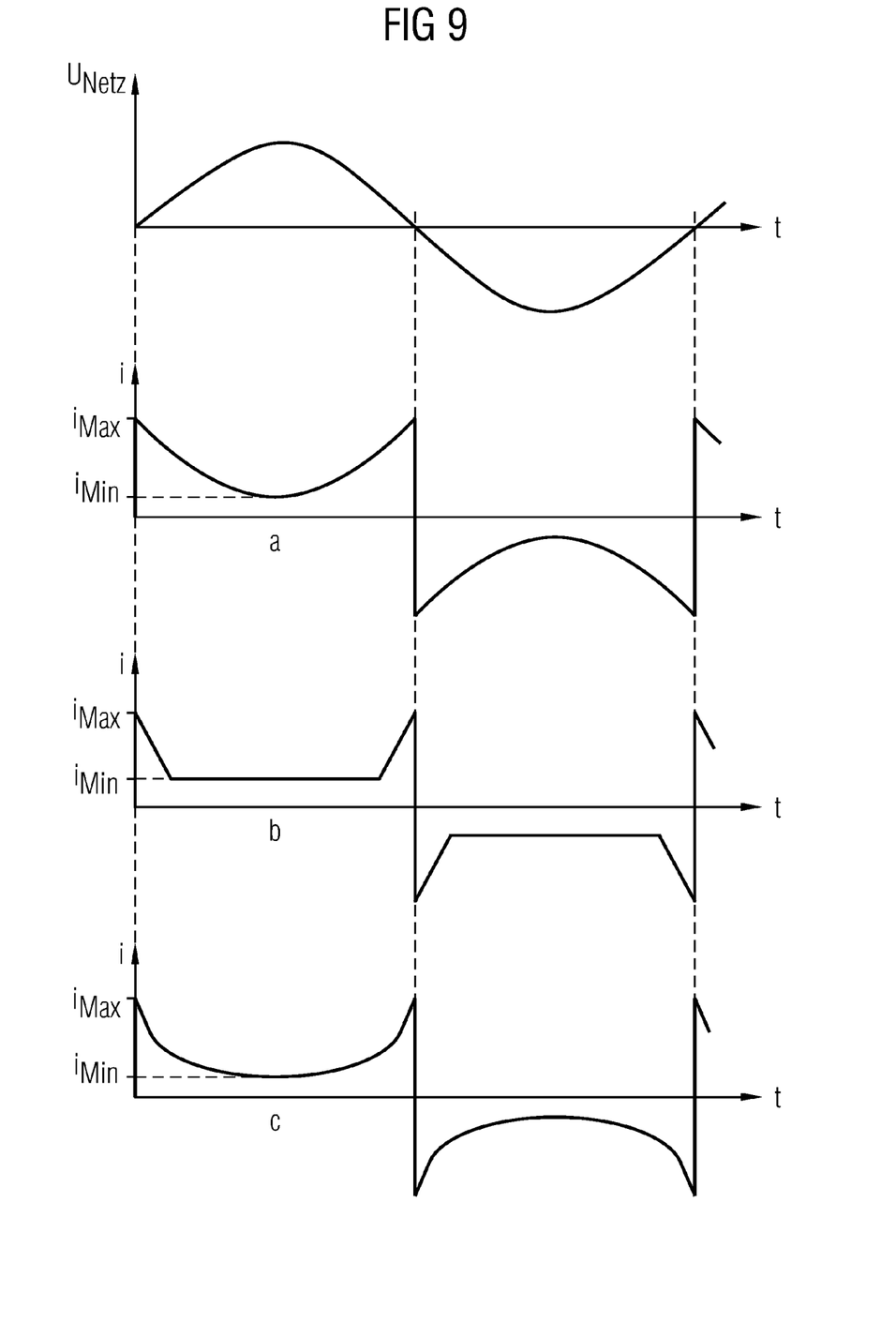

The signal processing and the signal curve for a bidirectional current sink are shown in FIGS. 8 and 9.

In FIG. 8 the voltage-controlled or current-controlled current sink 12 is switched in series with a zero-crossing detector 32 between live conductor L and neutral conductor N of an alternating current network. The mains voltage $N_{NETZ}$ is supplied to a control device 22 of the current sink 12. In the control device 22 a current sink voltage $U_S$ is formed as function of the reciprocal of the mains voltage $U_{NETZ}$, with here, other than with a unidirectional current sink a function is specified for both polarities of the mains voltage $U_{NETZ}$. FIG. 8 shows linear functions with restriction of the current sink voltage $U_S$ for both the negative and also for the positive mains voltage values.

The current sink voltage $U_S$ is supplied to the current sink 12, with the curve of the measurement current i through the current sink 12 being specified by multiplication of said current by a factor K.

FIG. 9 shows three different examples of a measurement current curve a, b, c over the time t, indirectly proportional to the mains voltage $U_{NETZ}$. In this figure a curve a, b, c corresponding to the respective function $f(1/U_{NETZ})$ is specified both for the positive and also for the negative half wave of the mains voltage $U_{NETZ}$.

The first curve corresponds to a linear function of the measurement current i over the mains voltage $U_{NETZ}$ with a prespecified maximum value $i_{Max}$ and a minimum value $i_{Min}$. The second curve b is also based on a linear function, with however for the positive half wave of the mains voltage $U_{NETZ}$ a positive value with minimum amount $i_{Min}$ and for the negative half wave of the mains voltage $U_{NETZ}$ a negative value with minimum amount being specified. The third typical curve c of the measurement current i over time t is based on a non-linear function of the measurement current i of mains voltage $U_{NETZ}$.

Any other function can be selected both for the unidirectional and also for the bidirectional current sinks. In such cases only the specification of a high measurement current in the area of low mains voltage $U_{NETZ}$ with simultaneous low power dissipation by the current sink is to be taken into account.

The invention claimed is:

1. A circuit arrangement for detection of zero crossings of a network voltage of an alternating current network, comprising:
    a zero crossing detector, a measurement current being supplied to the zero crossing detector to form a zero crossing signal;
    a variable current sink arranged between live conductor and neutral conductor of the alternating current network, wherein the network voltage of the alternating current network constitutes a mains voltage across the live conductor and neutral conductor;
    a control unit coupled to receive the mains voltage and dynamically control a level of amplification imparted to the measurement current supplied to the zero crossing detector as a function of amplitude variation of the mains voltage,
    wherein the variable current sink is arranged in series with an element for electrical isolation,
    wherein the element for electrical isolation is an optocoupler.

2. The circuit arrangement as claimed in claim 1, wherein the level of amplification imparted by the control unit to the measurement current supplied to the zero crossing detector is limited by a minimum value at least when an amplitude of the mains voltage comprises a maximum value.

3. The circuit arrangement as claimed in claim 1, wherein the variable current sink is a unidirectional current sink.

4. The circuit arrangement as claimed in claim 1, wherein the variable current sink is a bidirectional current sink.

5. An inverter for feeding electrical energy into an alternating current network, comprising:
    a circuit arrangement for detection of zero crossings of a network voltage of an alternating current network, the circuit arrangement comprising:
        a zero crossing detector, a measurement current being supplied to the zero crossing detector to form a zero crossing signal;
        a variable current sink arranged between live conductor and neutral conductor of the alternating current network, wherein the network voltage of the alternating current network constitutes a mains voltage across the live conductor and neutral conductor;
        a control unit coupled to receive the mains voltage and dynamically control a level of amplification imparted to the measurement current supplied to the zero crossing detector as a function of amplitude variation of the mains voltage,
    wherein the variable current sink is arranged in series with an element for electrical isolation and the element for electrical isolation is an optocoupler.

6. The inverter as claimed in claim 5, wherein the level of amplification imparted by the control unit to the measurement current supplied to the zero crossing detector is limited by a minimum value at least when an amplitude of the mains voltage comprises a maximum value.

7. The inverter as claimed in claim 5, wherein the variable current sink is a unidirectional or bidirectional current sink.

8. The inverter as claimed in claim 5, wherein the level of amplification imparted by the control unit to the measurement current supplied to the zero crossing detector comprises at least a first level of amplification when the amplitude of the mains voltage is proximate respective zero crossings and further wherein the level of amplification imparted by the control unit to the measurement current supplied to the zero crossing detector comprises a second level of amplification when the amplitude of the mains voltage is proximate respective peak values, wherein the first level of amplification is relatively higher compared to the second level of amplification.

9. A circuit arrangement for detection of zero crossings of a network voltage of an alternating current network, comprising:
    a zero crossing detector, a measurement current being supplied to the zero crossing detector to form a zero crossing signal;
    a variable current sink arranged between live conductor and neutral conductor of the alternating current network, wherein the network voltage of the alternating current network constitutes a mains voltage across the live conductor and neutral conductor;
    a control unit coupled to receive the mains voltage and dynamically control a level of amplification imparted to the measurement current supplied to the zero crossing detector as a function of amplitude variation of the mains voltage,
    wherein the level of amplification imparted by the control unit to the measurement current supplied to the zero crossing detector comprises at least a first level of amplification when the amplitude of the mains voltage is proximate respective zero crossings and further wherein the level of amplification imparted by the control unit to the measurement current supplied to the zero crossing detector comprises a second level of amplification when the amplitude of the mains voltage is proximate respective peak values, wherein the first level of amplification is relatively higher compared to the second level of amplification.

* * * * *